(12) United States Patent
Maeda (10) Patent No.: US 10,666,828 B2
(45) Date of Patent: May 26, 2020

(54) IMAGE FORMING APPARATUS AND IMAGE DISPLAY METHOD

(71) Applicant: KYOCERA Document Solutions Inc., Osaka (JP)

(72) Inventor: Koji Maeda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/546,551

(22) Filed: Aug. 21, 2019

(65) Prior Publication Data

US 2020/0068087 A1 Feb. 27, 2020

(30) Foreign Application Priority Data

Aug. 22, 2018 (JP) .................................. 2018-155488

(51) Int. Cl.
*H04N 1/00* (2006.01)
*H04N 1/203* (2006.01)

(52) U.S. Cl.
CPC ....... *H04N 1/2038* (2013.01); *H04N 1/00013* (2013.01); *H04N 1/00045* (2013.01); *H04N 1/00074* (2013.01); *H04N 1/00469* (2013.01); *H04N 2201/0094* (2013.01)

(58) Field of Classification Search
CPC . H04N 1/2038; H04N 1/00469; H04N 1/2036
See application file for complete search history.

(56) References Cited

U.S. PATENT DOCUMENTS

2017/0230538 A1\* 8/2017 Ono ..................... H04N 1/3876
2018/0225541 A1\* 8/2018 Kobayashi ........... G06K 9/4633
2018/0367694 A1\* 12/2018 Asakawa ........... H04N 1/00761

FOREIGN PATENT DOCUMENTS

JP 2007-206939 A 8/2007

\* cited by examiner

*Primary Examiner* — Benjamin O Dulaney
(74) *Attorney, Agent, or Firm* — Studebaker & Brackett PC (57) ABSTRACT

An image forming apparatus includes a display section, a display controller, a reading section, an image detector, and a determining section. The display controller controls the display section. The reading section reads multiple documents placed on a specific surface of the image forming apparatus in a batch and generates whole image data indicating a whole image as a result of reading. The image detector detects document images corresponding to the documents based on the whole image data. The determining section determines whether or not batch reading of the documents has succeeded based on a result of detection of the document images. The display controller controls the display section such that the display section displays the document images in a first display format when the determining section determines that the reading has not succeeded, or in a second display format when the determining section determines that the reading has succeeded.

6 Claims, 5 Drawing Sheets

IMAGE FORMING APPARATUS AND IMAGE DISPLAY METHOD

INCORPORATION BY REFERENCE

The present application claims priority under 35 U.S.C. § 119 to Japanese Patent Application No. 2018-155488, filed on Aug. 22, 2018. The contents of this application are incorporated herein by reference in their entirety.

BACKGROUND

The present disclosure relates to an image forming apparatus and an image display method.

A technique is provided by which multiple small documents such as name cards loaded on a document table are read in a batch, and images indicating the documents are extracted from read image data. In such a technique, the extracted image data of the documents is saved in a database or transmitted to a destination.

SUMMARY

An image forming apparatus according to an aspect of the present disclosure includes a display section, a display controller, a reading section, an image detector, and a determining section. The display controller controls the display section. The reading section reads multiple documents placed on a specific surface of the image forming apparatus in a batch and generates whole image data indicating a whole image as a result of reading. The image detector detects document images corresponding to the documents based on the whole image data. The determining section determines whether or not batch reading of the documents has succeeded based on a result of detection of the document images. The display controller controls the display section such that the display section displays the document images in a first display format when the determining section determines that the batch reading has not succeeded, or controls the display section such that the display section displays the document images in a second display format when the determining section determines that the batch reading has succeeded. The first display format is a format in which the document images are displayed so as to match placement of the documents at time of the reading by the reading section. The second display format is a format in which the document images are displayed as aligned with each other and enlarged.

An image display method according to an aspect of the present disclosure is for implementation by an image forming apparatus including a display section. The image display method includes: generating whole image data by reading multiple documents placed on a specific surface of the image forming apparatus in a batch, the whole image data indicating a whole image as a result of reading: detecting document images corresponding to the documents based on the whole image data; determining whether or not batch reading of the documents has succeeded based on a result of detection when the document images have been detected; and controlling the display section such that the display section displays the document images in a first display format when determining that the reading has not succeeded, or controlling the display section such that the display section displays the document images in a second display format when determining that the reading has succeeded. The first display format is a format in which the document images are displayed so as to match placement of the documents at time of the reading. The second display format is a format in which the document images are displayed as aligned with each other and enlarged.

DETAILED DESCRIPTION

The following describes an image forming apparatus according to an embodiment of the present disclosure with reference to the drawings. Elements that are the same or equivalent are labeled with the same reference signs in the drawings and description thereof is not repeated.

Figure 1:
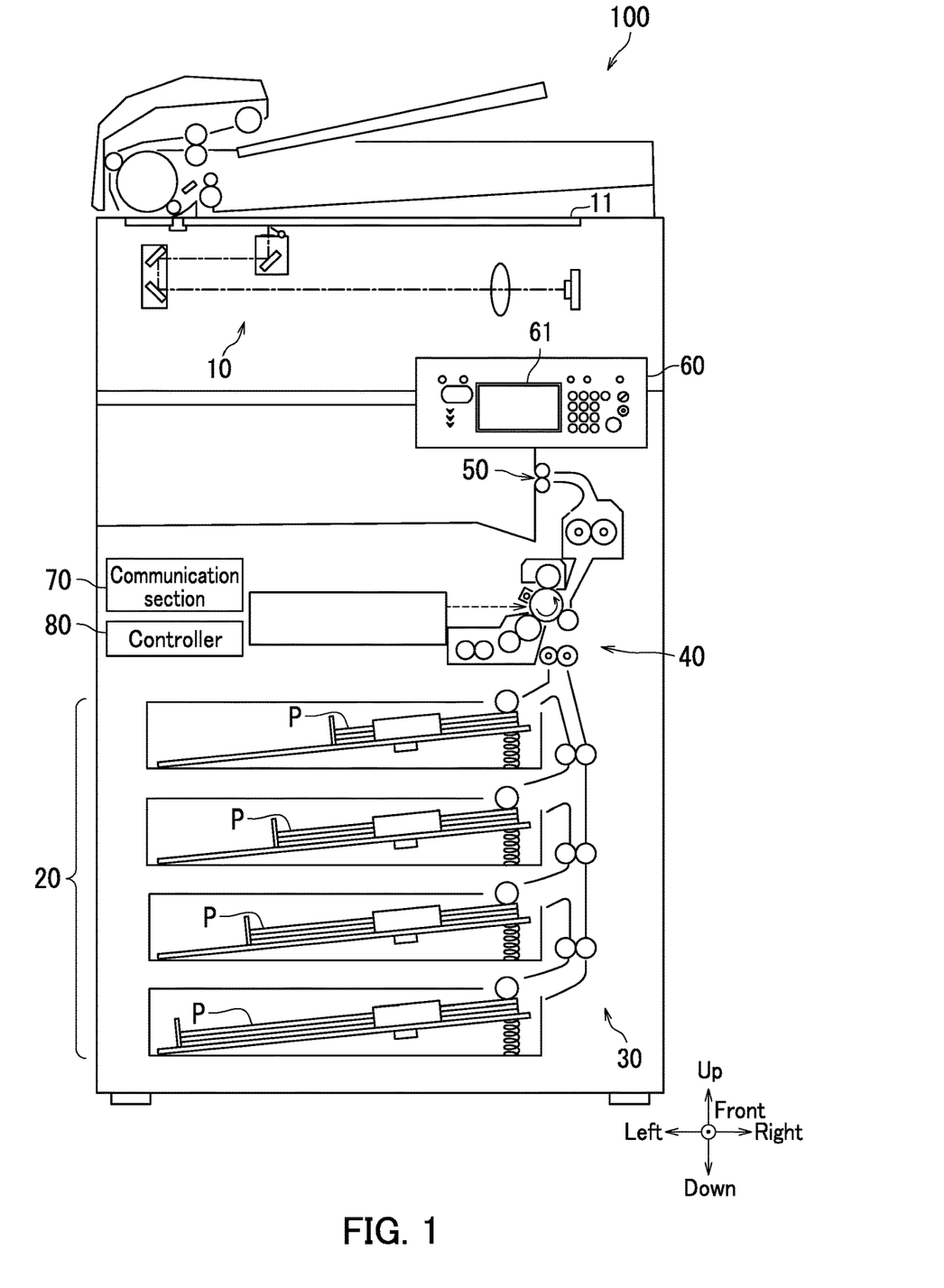
FIG. 1 is an outline diagram illustrating a configuration of an image forming apparatus according to an embodiment of the present disclosure.

The following describes a configuration of an image forming apparatus 100 according to the embodiment of the present disclosure with reference to FIG. 1. FIG. 1 is an outline diagram illustrating the configuration of the image forming apparatus 100 according to the embodiment of the present disclosure. According to the present embodiment, the image forming apparatus 100 is a multifunction peripheral. The image forming apparatus 100 has a scanner function, a copy function, and a communication function.

As illustrated in FIG. 1, the image forming apparatus 100 includes an image reading section 10, paper feed cassettes 20, a paper conveyance section 30, an image forming section 40, a paper ejecting section 50, an input and output section 60, a communication section 70, and a controller 80.

The image reading section 10 includes a document table 11. Multiple documents are placed on the document table 11. Examples of the documents include name cards, license cards, and ID cards. The image reading section 10 reads multiple documents placed on a specific surface of the image forming apparatus in a batch and generates whole image data indicating a whole image as a result of reading. Specifically, the image reading section 10 reads an image of one side (front side, for example) of the documents placed on an upper surface of the document table 11 in a batch and generates the whole image data. The image reading section 10 transmits the whole image data to the controller 80. The image reading section 10 is an example of a reading section.

The paper feed cassettes 20 house a recording medium P for printing. When printing is performed, the recording medium P in the paper feed cassettes 20 is conveyed by the paper conveyance section 30 to pass through the image forming section 40 and be ejected from the paper ejecting section 50.

The paper conveyance section 30 conveys the recording medium P through the image forming section 40 to the paper ejecting section 50.

The image forming section 40 forms an image on the recording medium P based on image data for printing generated by the controller 80. The recording medium P is paper, for example.

The input and output section 60 detects various touch operations by a user of the image forming apparatus 100. The input and output section 60 receives an instruction from the user through a touch operation. The input and output section 60 receives the number of documents from the user, for example. Furthermore, the input and output section 60 receives an instruction to change a document image display format. The instruction to change the document image display format is described later with reference to FIG. 2.

The input and output section 60 includes a display section 61. The display section 61 displays various information notifying the user. The display section 61 displays a preview screen described later with reference to FIGS. 3 and 4, for example. The input and output section 60 is a liquid-crystal display with a touch panel, for example. The input and output section 60 is an example of a reception section and a notification section.

The communication section 70 is capable of communication with an electronic device using the same communication method (protocol) as the communication section 70. According to the present embodiment, the communication section 70 communicates with an external information processing device (hereafter, the external information processing device is referred to as an "external device") through a network such as the Internet or a local area network (LAN). The communication section 70 is a communication module such as a LAN board, for example.

The controller 80 controls operation of each element of configuration of the image forming apparatus 100. The controller 80 also receives image data generated by the image reading section 10 and generates image data for printing or image data for transmission. Specifically, the controller 80 receives the whole image data generated by the image reading section 10 and generates document image data of document images to be displayed on the display section 61.

Figure 2:
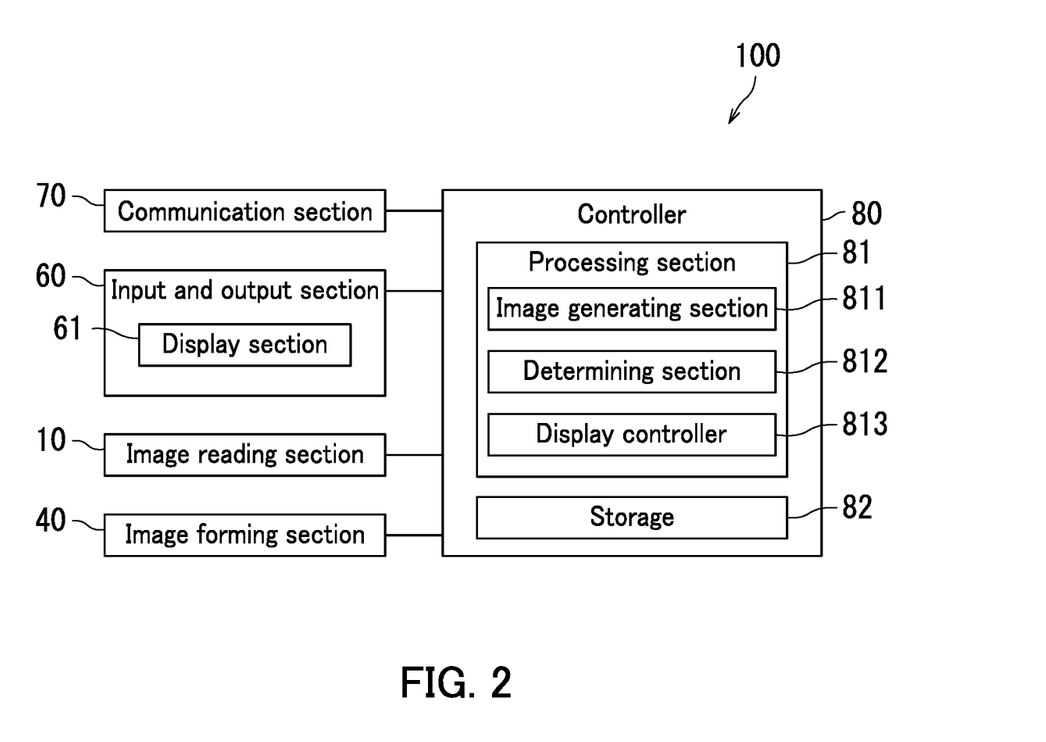
FIG. 2 is a block diagram illustrating the configuration of the image forming apparatus.

The following particularly describes a configuration of the controller 80 in detail among the elements of configuration of the image forming apparatus 100 with reference to FIGS. 1 and 2. FIG. 2 is a block diagram illustrating the configuration of the image forming apparatus 100.

As illustrated in FIG. 2, the controller 80 includes a processing section 81 and storage 82. The processing section 81 is a processor, for example. The processor is a central processing unit (CPU), for example. The processing section 81 controls operation of each element of configuration of the image forming apparatus 100 by executing a control program stored in the storage 82.

The storage 82 stores therein various data and the control program. The storage 82 is constituted by one or more of read-only memory (ROM), random-access memory (RAM), and a solid-state drive (SSD), for example. The storage 82 may also include external memory. The external memory is removable media. The storage 82 may include either or both of Universal Serial Bus (USB) memory and a Secure Digital (SD) card, for example, as the external memory.

The processing section 81 includes an image generating section 811, a determining section 812, and a display controller 813. According to the present embodiment, the functions of the image generating section 811, the determining section 812, and the display controller 813 are implemented by the processing section 81 executing the control program stored in the storage 82.

The image generating section 811 receives the whole image data from the image reading section 10. The image generating section 811 also detects document images corresponding to documents from the whole image data generated by the image reading section 10 and generates document image data indicating the document images. The document images each are an image corresponding to one of the documents placed on the document table 11. Specifically, the image generating section 811 uses a common multi-auto crop function to generate the document image data from the whole image data. The image generating section 811 is an example of an image detector.

The image generating section 811 for example detects edges of an image corresponding to edges of each of the documents within the whole image based on a density distribution of the % hole image. The image generating section 811 also extracts multiple pieces of image data based on the edges of the images. The image generating section 811 specifies the number of the pieces of image data when the image data is extracted. The image forming apparatus 100 may be a color multifunction peripheral. In a color multifunction peripheral, edges of each rectangular image are detected based on a distribution of color tones in the whole image.

According to the present embodiment, the image generating section 811 adds position information and size information to the generated document image data. The position information indicates a position of each document image on the document table 11. The size information indicates the size of the document image. For example, the image generating section 811 calculates a central position of the document image based on a reference position of the document table 11. The image generating section 811 also calculates the size of the document image based on the edges of the document image. The reference position of the document table 11 is a back right corner, for example.

The determining section 812 determines whether or not batch reading of the documents (hereafter, batch reading of the documents is referred to as "batch reading") has succeeded based on the result of detection of the document images by the image generating section 811. Specifically, the determining section 812 determines whether or not batch reading has succeeded based on whether or not the number of document images matches the number of documents received by the input and output section 60.

The display controller 813 controls the display section 61 such that the display section 61 displays an image. The display controller 813 also controls the display section 61 so as to change the image displayed thereon based on an instruction from the user to the display section 61. Specifically, the display controller 813 controls the display section 61 such that the display section 61 displays the document images in a first display format when the determining section 812 determines that batch reading has not succeeded. The display controller 813 also controls the display section 61 such that the display section 61 displays the document images in a second display format when the determining section 812 determines that batch reading has succeeded. Here, the first display format is a format in which the document images are displayed so as to match the placement of the documents at time of reading by the image reading section 10. The second display format is a format in which the document images are displayed as aligned with each other and enlarged.

The display controller 813 changes the document image display format based on an instruction received by the input and output section 60, and controls the display section 61 such that the display section 61 displays the document images. Specifically, the display controller 813 changes the document image display format according to an instruction received by the input and output section 60 to change the document image display format between the first and second display formats, and controls the display section 61 such that the display section 61 displays the document images. Through the above, the user can cause display of the document images in a desired display format.

In a case where the determining section 812 determines that batch reading has succeeded, the display controller 813 may also control the display section 61 such that the display section 61 displays the document images in the first display format when the number of documents received from the user is equal to or greater than a predetermined value. The predetermined value is five, for example. That is, the document images are displayed so as to match the placement of the documents at time of reading when the number of documents is equal to or greater than the predetermined value even in a case where batch reading has not failed. Through the above, the user can easily understand the condition of the document images after batch reading.

The following describes an image display process performed by the image forming apparatus 100 with reference to FIGS. 1 to 5. The image display process is a process through which the user is notified of the condition of a result of reading when multiple documents have been read in a batch.

Figure 3:
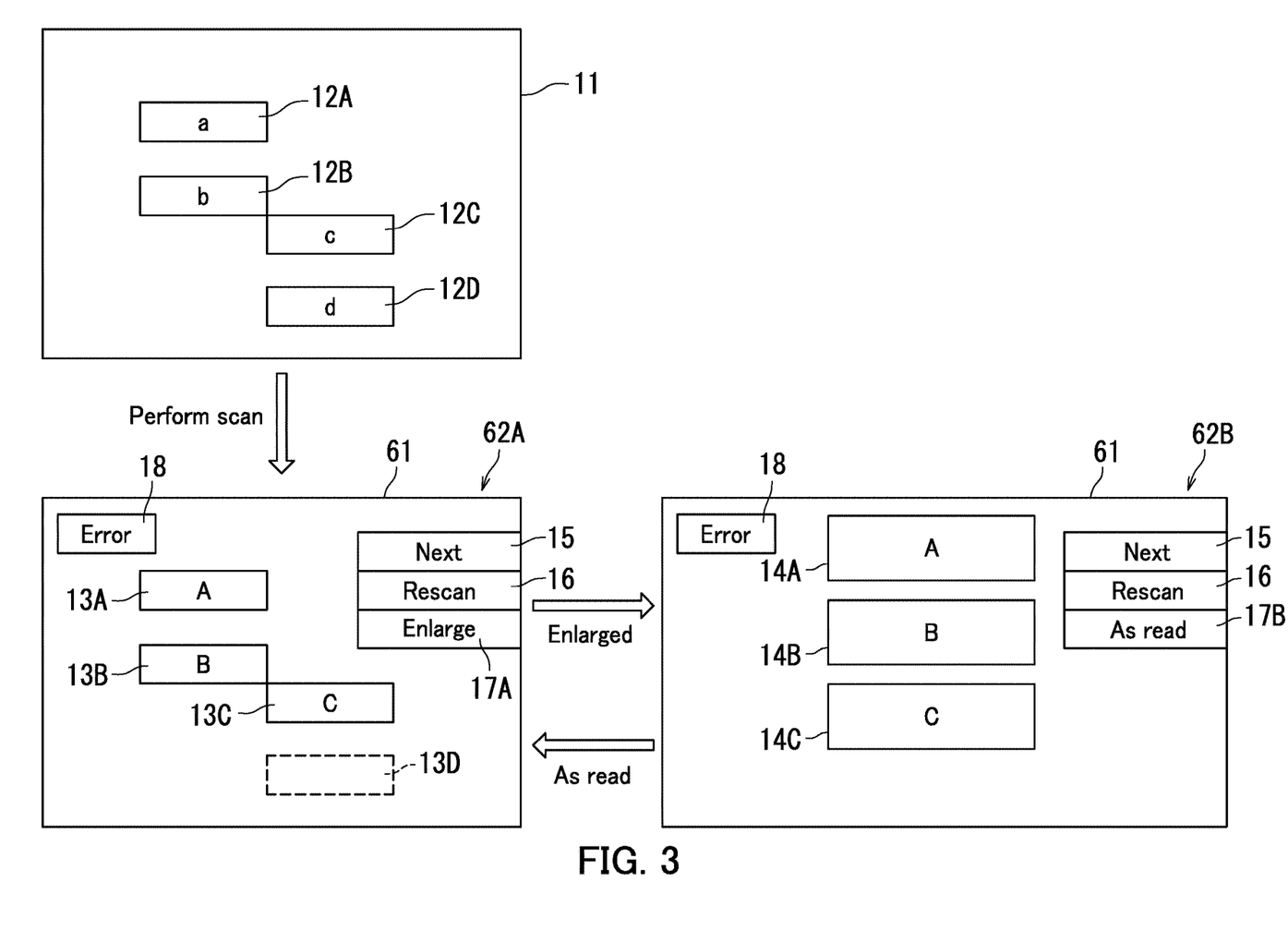
FIG. 3 is a schematic illustration of an outline of an image display process in a case where batch reading has failed.

FIG. 3 is a schematic illustration of an outline of the image display process in a case where batch reading has failed. FIG. 3 illustrates a screen 62A, a screen 62B, and the documents placed on the document table 11.

Documents 12A to 12D are placed on the document table 11 such that back sides of the documents 12A to 12D can be seen. Specifically, a pattern on the back side of the document 12A represents "a", a pattern on the back side of the document 12B represents "b", a pattern on the back side of the document 12C represents "c", and a pattern on the back side of the document 12D represents "d". Here, a pattern on the front side of the document 12A represents "A", a pattern on the front side of the document 12B represents "B", a pattern on the front side of the document 12C represents "C", and a pattern on the front side of the document 12D represents "D".

The screen 62A displays document images 13A to 13C, a next button 15, a rescan button 16, an enlarge button 17A, and an error mark 18. The document images 13A to 13C are document images detected by performing batch reading. The document images 13A to 13C are displayed on the display section 61 so as to match the placement of the documents at time of batch reading by the image reading section 10. That is, the document images 13A to 13C are displayed in the first display format. As indicated by a dotted line in FIG. 3, a document image 13D corresponding to the document 12D has not been detected. The next button 15 is used for advancing the process to the next predefined phase. The rescan button 16 is used for performing rereading. The enlarge button 17A is used for displaying the detected document images in an enlarged manner on the display section 61. The error mark 18 indicates that batch reading has failed.

In the example of FIG. 3, batch reading has failed because the document image 13D among the document images 13A to 13D was not detected. Because the display controller 813 displays the error mark 18, the user can easily understand that batch reading has failed. Furthermore, in a case where batch reading has failed, the display controller 813 displays the document images on the display section 61 in the first display format. Thus, the user can easily understand the position of the document that failed to be read in batch reading.

The screen 62B displays document images 14A to 14C, the next button 15, the rescan button 16, an as read button 17B, and the error mark 18. The document images 14A to 14C are enlarged versions of the document images 13A to 13C displayed in a mutually aligned manner on the display section 61. That is, the document images 14A to 14C are displayed in the second display format. The as read button 17B is used for returning the document images 14A to 14C displayed on the display section 61 to the document images 13A to 13C. As illustrated in the screen 62B, the display controller 813 enlarges and aligns the document images 13A to 13C with each other to display the document images 14A to 14C on the display section 61. Thus, the user can understand the details of the document images when batch reading has failed.

As illustrated in FIG. 3, the screen 62A is first displayed on the display section 61 when batch reading is performed in a state in which the documents 12A to 12D are placed on the document table 11. Furthermore, the screen 62B is displayed on the display section 61 when the enlarge button 17A in the screen 62A is pressed. When the as read button 17B in the screen 62B is pressed, the screen 62A is displayed on the display section 61. It should be noted that in FIGS. 3 and 4, "perform batch reading" is shown as "perform scan".

Figure 4:
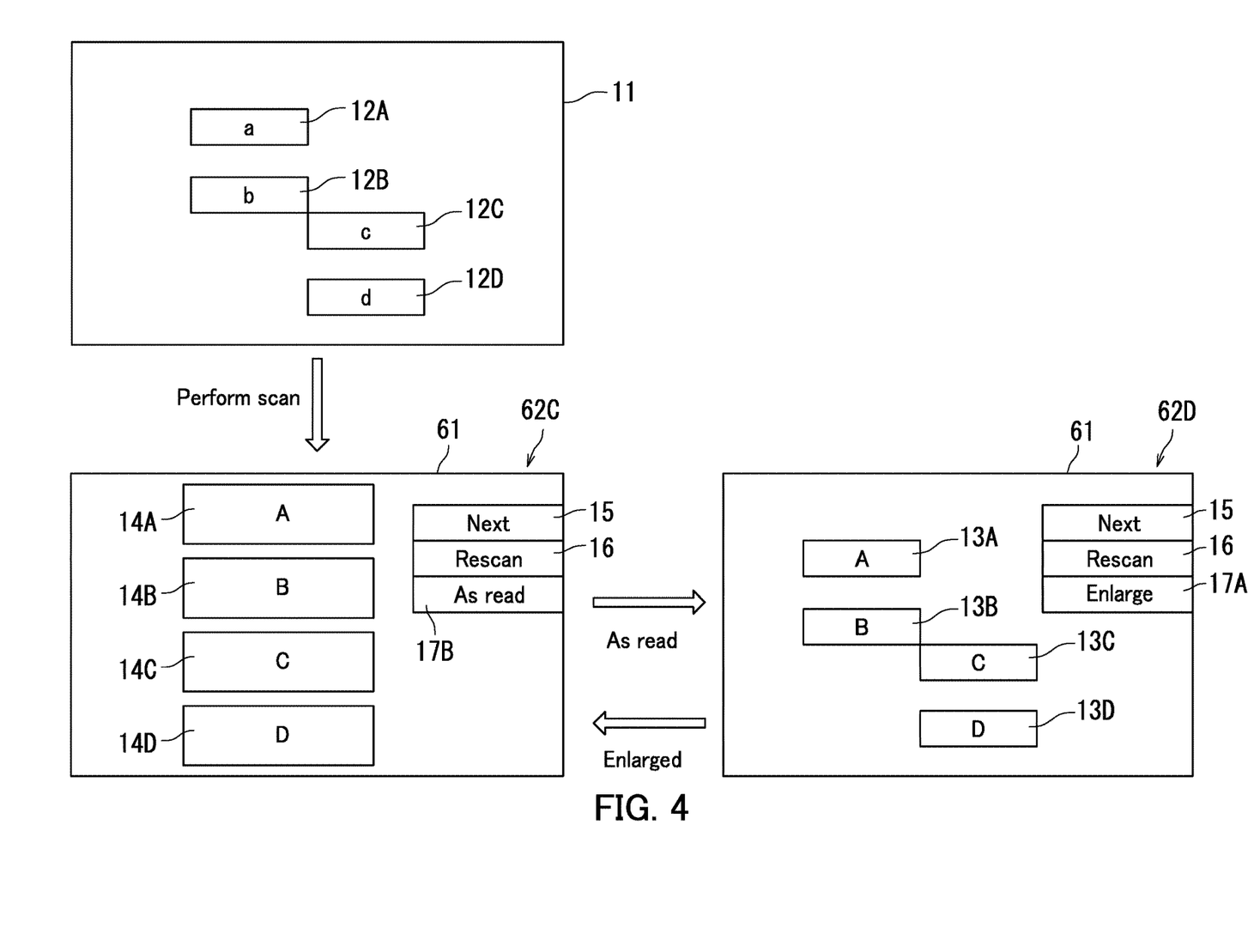
FIG. 4 is a schematic illustration of an outline of the image display process in a case where batch reading has succeeded.

FIG. 4 is a schematic illustration of an outline of the image display process in a case where batch reading has succeeded. FIG. 4 illustrates a screen 62C, a screen 62D, and the documents placed on the document table 11.

Similarly to FIG. 3, documents 12A to 12D are placed on the document table 11 in FIG. 4 such that the back sides of the documents 12A to 12D can be seen.

The screen 62C displays document images 14A to 14D, the next button 15, the rescan button 16, and the as read button 17B. The document images 14A to 14D are document images detected by performing batch reading. The document images 14A to 14D are displayed on the display section 61 in a format in which the document images detected by the image reading section 10 performing batch reading have been aligned in placement and enlarged. That is, the document images 14A to 14D are displayed in the second display format. In the example of FIG. 4, batch reading has succeeded because all of the document images 14A to 14D corresponding to the documents 12A to 12D have been detected. As shown in the screen 62C, in a case where batch reading has succeeded, the display controller 813 displays the document images on the display section 61 not in the first display format but in the second display format. Thus, the user can understand the content of the read documents.

The screen 62D displays the document images 13A to 13D, the next button 15, the rescan button 16, and the enlarge button 17A. The document images 13A to 13D are displayed in the first display format.

In a state where the documents 12A to 12D are placed on the document table 11, the screen 62C is displayed on the display section 61 when batch reading is performed. When the as read button 17B in the screen 62C is pressed, the screen 62D is displayed on the display section 61. The screen 62C is displayed on the display section 61 when the enlarge button 17A in the screen 62D is pressed.

Figure 5:
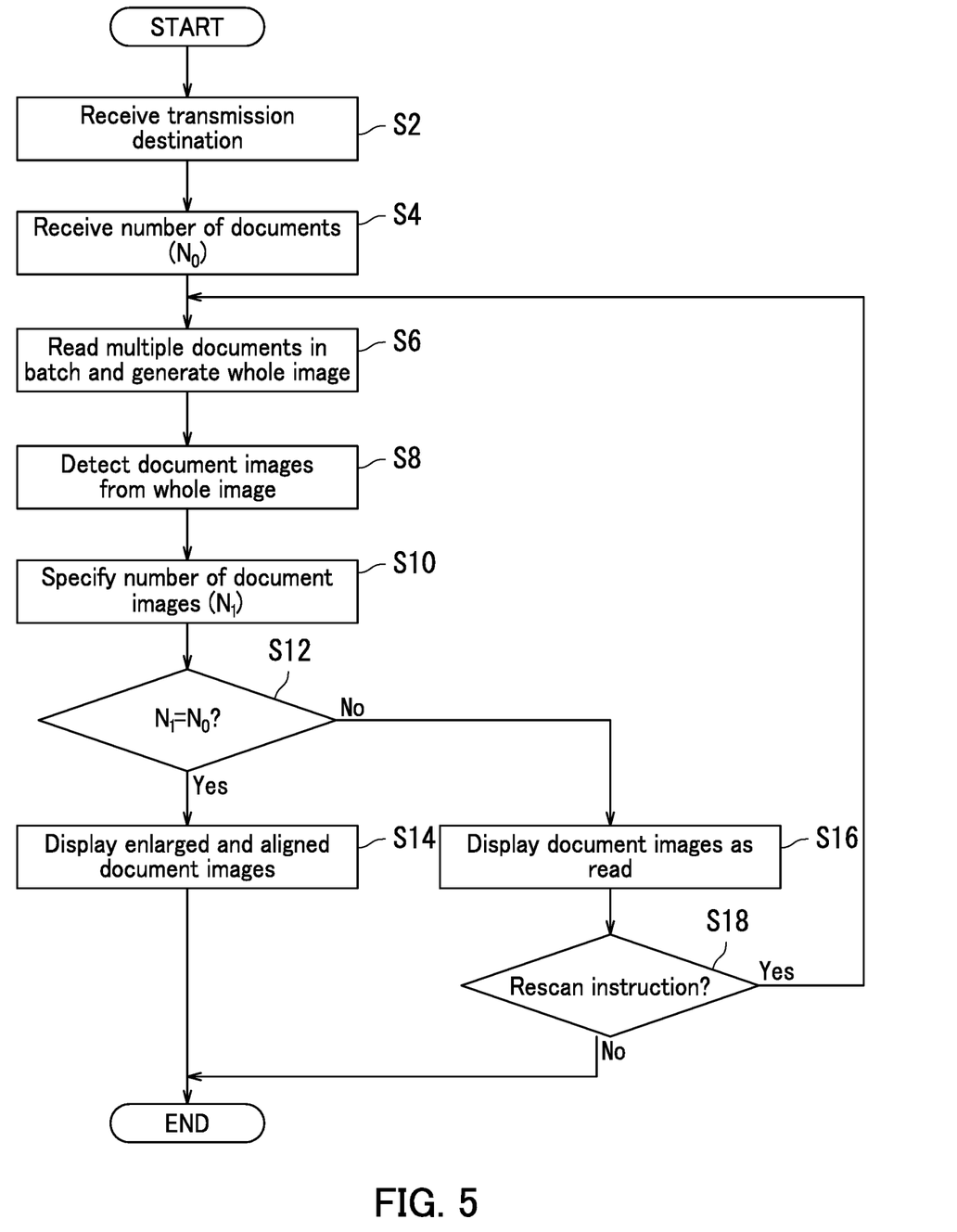
FIG. 5 is a flowchart depicting the image display process of the image forming apparatus.

FIG. 5 is a flowchart depicting the image display process. The image display process is performed through Steps S2 to S18. The image display process includes a reading process, a determination process, and a display process.

In the reading process, the image reading section 10 generates whole image data indicating a whole image which is a result of reading multiple documents in a batch. Also in the reading process, the image generating section 811 detects document images corresponding to the documents based on the whole image data and specifies the number of detected document images. The reading process is equivalent to processes performed in Steps S6 to S10.

In the determination process, the determining section 812 determines whether or not batch reading has succeeded based on the number of document images. The determination process is equivalent to processes performed in Step S12.

In the display process, the display controller 813 controls the display section 61 such that the display section 61 displays a result of reading including a result of determination by the determining section 812. The display process is equivalent to processes performed in Step S14 or S16.

Step S2: The input and output section 60 receives, from the user, a destination to which the documents are to be transmitted. The process advances to Step S4.

Step S4: The input and output section 60 receives from the user the number of documents (N0) to be read. The process advances to Step S6.

Step S6: The image reading section 10 reads the documents in a batch and generates the whole image data. The process advances to Step S8.

Step S8: The image generating section 811 detects the document image data from the whole image data. The process advances to Step S10.

Step S10: The image generating section 811 specifies the number of detected document images (N1). The process advances to Step S12.

Step S12: The determining section 812 determines whether or not the number of documents (N0) is equal to the number of document images (N1). When the determining section 812 determines that the number of documents (N0) is equal to the number of document images (N1) (Yes in Step S12), the process advances to Step S14. When the determining section 812 determines that the number of documents (N0) is not equal to the number of document images (N1) (No in Step S12), the process advances to Step S16.

Step S14: The display controller 813 enlarges and aligns the document images with each other, and displays the enlarged and aligned document images on the display section 61. The image display process ends.

Step S16: The display controller 813 displays the document images on the display section 61 so as to match the placement of the documents at time of reading. In FIG. 5, "display on the display section 61 so as to match the placement of the documents at time of reading" is shown as "display as read". The process advances to Step S18.

Step S18: The display controller 813 determines whether or not there is a rescan instruction from the user. When the display controller 813 determines that there is a rescan instruction from the user (Yes in Step S18), the process advances to Step S6. When the display controller 813 determines that there is no rescan instruction from the user (No in Step S18), the image display process ends.

According to the image forming apparatus 100 of the present embodiment as described above, the document images are displayed on the display section 61 so as to match the placement of the documents at time of document reading in a case where batch reading has failed. Accordingly, the user can easily compare the positional relationship of the documents at time of document reading to the positional relationship of the read document images. As a result, the user can easily understand which document has failed to be read in reading the documents in a batch.

The embodiment of the present disclosure is described above with reference to the drawings (FIGS. 1 to 5). However, the present disclosure is not limited to the above embodiment and may be implemented in various manners within a scope not deviating from the gist of the present disclosure (as described below in (1) and (2), for example). The drawings mainly illustrate elements of configuration schematically to facilitate understanding thereof. Aspects of the elements of configuration such as thickness, length, and number thereof may differ in practice for the sake of convenience for drawing preparation. Furthermore, aspects of the elements of configuration described in the above embodiment, such as material, shape, and dimension thereof, are merely examples and not meant as particular limitations. The elements of configuration may be variously altered within a scope not substantially deviating from the effect of the present disclosure.

(1) The image display process according to the present disclosure may be implemented such that activation is triggered by an operation of the user. For example, a configuration may be added in which a timer is started when the user opens a platen cover of the image forming apparatus 100, and the display section is controlled so as to display a screen recommending the image display process of the present disclosure when a specific period of time (five seconds, for example) has passed.

(2) According to the embodiment of the present disclosure, the image forming apparatus 100 is described using a multifunction peripheral as an example thereof, but the image forming apparatus 100 is not limited to a multifunction peripheral. For example, the image forming apparatus 100 may be a personal computer including either or both of a scanner and a printer.

Furthermore, the present disclosure may be implemented as an image display method including the characteristic means of configuration of the image forming apparatus according to the present disclosure as steps, or may be implemented as a control program including those steps. The program may be distributed through a storage medium such as a CD-ROM or a transmission medium such as a communication network.

What is claimed is:
1. An image forming apparatus comprising:
a display section;
a display controller configured to control the display section;
a reading section configured to read multiple documents placed on a specific surface of the image forming apparatus in a batch and generate whole image data indicating a whole image as a result of reading;
an image detector configured to detect document images corresponding to the documents based on the whole image data; and
a determining section configured to determine whether or not batch reading of the documents has succeeded based on a result of detection by the image detector, wherein
the display controller
controls the display section such that the display section displays the document images in a first display format when the determining section determines that the batch reading has not succeeded, or
controls the display section such that the display section displays the document images in a second display format when the determining section determines that the batch reading has succeeded, the first display format is a format in which the document images are displayed so as to match placement of the documents at time of the reading by the reading section, and the second display format is a format in which the document images are displayed as aligned with each other and enlarged.

2. The image forming apparatus according to claim 1, further comprising a notification section configured to notify of a result of determination by the determining section.

3. The image forming apparatus according to claim 1, further comprising a reception section configured to receive a number of the documents, wherein the image detector specifies a number of the document images, and the determining section determines whether or not the batch reading has succeeded based on whether or not the number of the document images matches the number of the documents.

4. The image forming apparatus according to claim 3, wherein the reception section receives an instruction to change a document image display format between the first display format and the second display format, and the display controller controls the display section such that the display section displays the document images in the first or second display format according to the instruction.

5. The image forming apparatus according to claim 3, wherein in a case where the determining section determines that the batch reading has succeeded, the display controller controls the display section such that the display section displays the document images in the first display format when the number of the documents is equal to or greater than a predetermined value.

6. An image display method for implementation by an image forming apparatus including a display section, the image display method comprising:

generating whole image data by reading multiple documents placed on a specific surface of the image forming apparatus in a batch, the whole image data indicating a whole image as a result of the reading;

detecting document images corresponding to the documents based on the whole image data;

determining whether or not batch reading of the documents has succeeded based on a result of detection when the document images have been detected; and controlling the display section such that the display section displays the document images in a first display format when determining that the reading has not succeeded, or displays the document images in a second display format when determining that the reading has succeeded, wherein the first display format is a format in which the document images are displayed so as to match placement of the documents at time of the reading, and the second display format is a format in which the document images are displayed as aligned with each other and enlarged.

\* \* \* \* \*